(12) United States Patent
Byrnes et al.

(10) Patent No.: US 10,935,868 B2
(45) Date of Patent: Mar. 2, 2021

(54) SYSTEM AND METHOD FOR DIFFRACTIVE STEERING OF ELECTROMAGNETIC RADIATION

(71) Applicant: The Charles Stark Draper Laboratory, Inc., Cambridge, MA (US)

(72) Inventors: Steven J. Byrnes, Watertown, MA (US); Gregg E. Favalora, Bedford, MA (US); Ian Ward Frank, Arlington, MA (US); Anthony Kopa, Somerville, MA (US); Jeffrey A. Korn, Lexington, MA (US); Michael G. Moebius, Somerville, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/140,714

(22) Filed: Sep. 25, 2018

(65) Prior Publication Data
US 2019/0094652 A1 Mar. 28, 2019

Related U.S. Application Data

(60) Provisional application No. 62/564,548, filed on Sep. 28, 2017.

(51) Int. Cl.
*G02B 6/26* (2006.01)
*G02B 6/02* (2006.01)
(Continued)

(52) U.S. Cl.
CPC .......... *G02F 1/335* (2013.01); *G02B 6/29311* (2013.01); *G02B 6/356* (2013.01);
(Continued)

(58) Field of Classification Search
CPC .. G02B 6/00; G02B 6/293; G02B 6/22; G02F 1/335; G03H 1/22; H04L 27/20
(Continued)

(56) References Cited

U.S. PATENT DOCUMENTS

| | | | | | |
|---|---|---|---|---|---|
| 4,067,641 | A | * | 1/1978 | Holton | G02B 6/30 385/131 |
| 4,084,130 | A | * | 4/1978 | Holton | G02B 6/30 257/E27.12 |

(Continued)

OTHER PUBLICATIONS

Bukkems, H.G., "New Approaches to Widely Tunable Semiconductor Lasers," Eindhoven: Technische Universiteit Eindhoven, 1-179 (2006).
(Continued)

*Primary Examiner* — Kaveh C Kianni
(74) *Attorney, Agent, or Firm* — HoustonHogle LLP

(57) ABSTRACT

A light steeling system and method for diffractive steering of electromagnetic radiation such as visible light is disclosed. Embodiments of the light steering system include leaky-mode SAW modulators as light modulator devices. The SAW modulators preferably include reflective diffractive gratings. The gratings are mounted to/patterned upon an exit face that opposes an exit surface of the SAW modulator, in one example. Steering of light signals emitted from the SAW modulators in these systems can be accomplished by varying wavelength of light signals introduced to the SAW modulators, and/or by varying frequency of RF drive signals applied to the SAW modulators. In addition, light field generators that incorporate SAW modulators of the proposed light steering system within displays of the light field generators are also disclosed.

13 Claims, 10 Drawing Sheets

(51) Int. Cl.
G02F 1/335 (2006.01)
G03H 1/22 (2006.01)
G02B 6/293 (2006.01)
H04L 27/20 (2006.01)
H04B 10/50 (2013.01)
G02B 6/35 (2006.01)
G02B 30/26 (2020.01)

(52) U.S. Cl.
CPC ............ G02B 30/26 (2020.01); G03H 1/2294 (2013.01); H04B 10/506 (2013.01); H04L 27/2003 (2013.01); *G02F 2203/22* (2013.01); *G02F 2203/24* (2013.01)

(58) Field of Classification Search
USPC .......................................................... 385/37
See application file for complete search history.

(56) References Cited

U.S. PATENT DOCUMENTS

| | | | | |
|---|---|---|---|---|
| 4,443,696 | A * | 4/1984 | Taboada | G02B 26/02 250/205 |
| 5,131,060 | A * | 7/1992 | Sakata | G02F 1/3133 257/184 |
| 5,504,772 | A * | 4/1996 | Deacon | H01S 3/063 372/102 |
| 5,717,510 | A * | 2/1998 | Ishikawa | H04B 10/0795 398/147 |
| 7,058,261 | B2 * | 6/2006 | Ghiron | G02B 6/12007 385/30 |
| 8,873,131 | B2 * | 10/2014 | Han | G02F 1/0072 359/305 |
| 9,508,377 | B2 * | 11/2016 | Yamazaki | G03H 1/265 |
| 9,613,886 | B2 * | 4/2017 | Lin | H01S 5/0208 |
| 10,149,958 | B1 * | 12/2018 | Tran | G06K 9/00604 |
| 10,156,725 | B2 * | 12/2018 | TeKolste | G02B 27/0172 |
| 10,365,434 | B2 * | 7/2019 | Wang | G01N 21/774 |
| 2002/0097962 | A1 * | 7/2002 | Yoshimura | G02B 6/10 385/50 |
| 2002/0141039 | A1 * | 10/2002 | Mermelstein | G02F 1/125 359/305 |
| 2003/0026512 | A1 * | 2/2003 | Deliwala | B82Y 20/00 385/2 |
| 2008/0239420 | A1 * | 10/2008 | McGrew | G02B 5/1828 359/11 |
| 2009/0040294 | A1 | 2/2009 | Smalley et al. | |
| 2013/0050788 | A1 * | 2/2013 | Maeng | G03H 1/2294 359/10 |
| 2013/0320190 | A1 * | 12/2013 | Chu | G01J 1/0414 250/205 |
| 2013/0321899 | A1 | 12/2013 | Haussler | |
| 2014/0104665 | A1 * | 4/2014 | Popovich | G02B 30/26 359/15 |
| 2014/0300694 | A1 | 10/2014 | Smalley et al. | |
| 2014/0300695 | A1 * | 10/2014 | Smalley | G02F 1/011 348/40 |
| 2017/0094265 | A1 | 3/2017 | Mullins et al. | |
| 2018/0329271 | A1 | 11/2018 | Frank et al. | |
| 2018/0341127 | A1 | 11/2018 | Frank et al. | |
| 2018/0364482 | A1 * | 12/2018 | Georgiou | G02B 27/0068 |
| 2019/0025666 | A1 | 1/2019 | Byrnes et al. | |
| 2019/0025667 | A1 | 1/2019 | Byrnes et al. | |

OTHER PUBLICATIONS

Hinkov, V.P., et al., "Collinear Acoustooptical TM-TE Mode Conversion in Proton Exchanged TI:LINbO3 Waveguide Structures," Journal of Lighwave Technology, 6(6): 903-908 (1988).

McLaughlin, S., et al., "Backside Emission Leaky-Mode Modulators," Optics Expression, 25(17): 20622-20627 (2017).

McLaughlin, S., et al., "Optimized Guided-To-Leaky-Mode Device for Graphics of Processing Unit Controlled Frequency Division of Color" Applied Optics, 54(12): 3732-3736 (2015).

Qaderi, K., et al., "Leaky-mode waveguide modulators with high deflection angle for use in holographic video displays," Opt. Expr., 24(18): 20831-20841 (2016).

Savidis, N., et al., "Progress in fabrication of waveguide spatial light modulators via femtosecond laser micromachining," Proc. of SPIE, 10115: 101150R-1-101150R-16 (2017).

Smalley, D.E., et al., "Anisotropic leaky-mode modulator for holographic video displays," Nature, 498: 313-318 (2013).

Smithwick, Q.Y.J., et al., "Interactive Holographic Stereograms with Accommodation Cues," Proc. SPIE 7619, Practical Holography XXIV: Materials and Applications, 761903-761913 (2010).

Poulton, C.V., et al., "Coherent Solid-State LIDAR with Silicon Photonic Optical Phased Arrays," Optics Letters, 42(20), 4091-4094 (2017).

Poulton, C.V., et al., "Long-Range LiDAR and Free-Space Data Communication with High-Performance Optical Phase Arrays," IEEE Journal of Selected Topics in Quantum Electronics, 25(5): 1-8 (2019).

Partial Search Report dated Mar. 6, 2019, from International Application No. PCT/US2018/052531, filed on Sep. 25, 2018. 13 pages.

International Search Report and Written Opinion dated Apr. 30, 2019, from International Application No. PCT/US2018/052531, filed on Sep. 25, 2018. 20 pages.

* cited by examiner

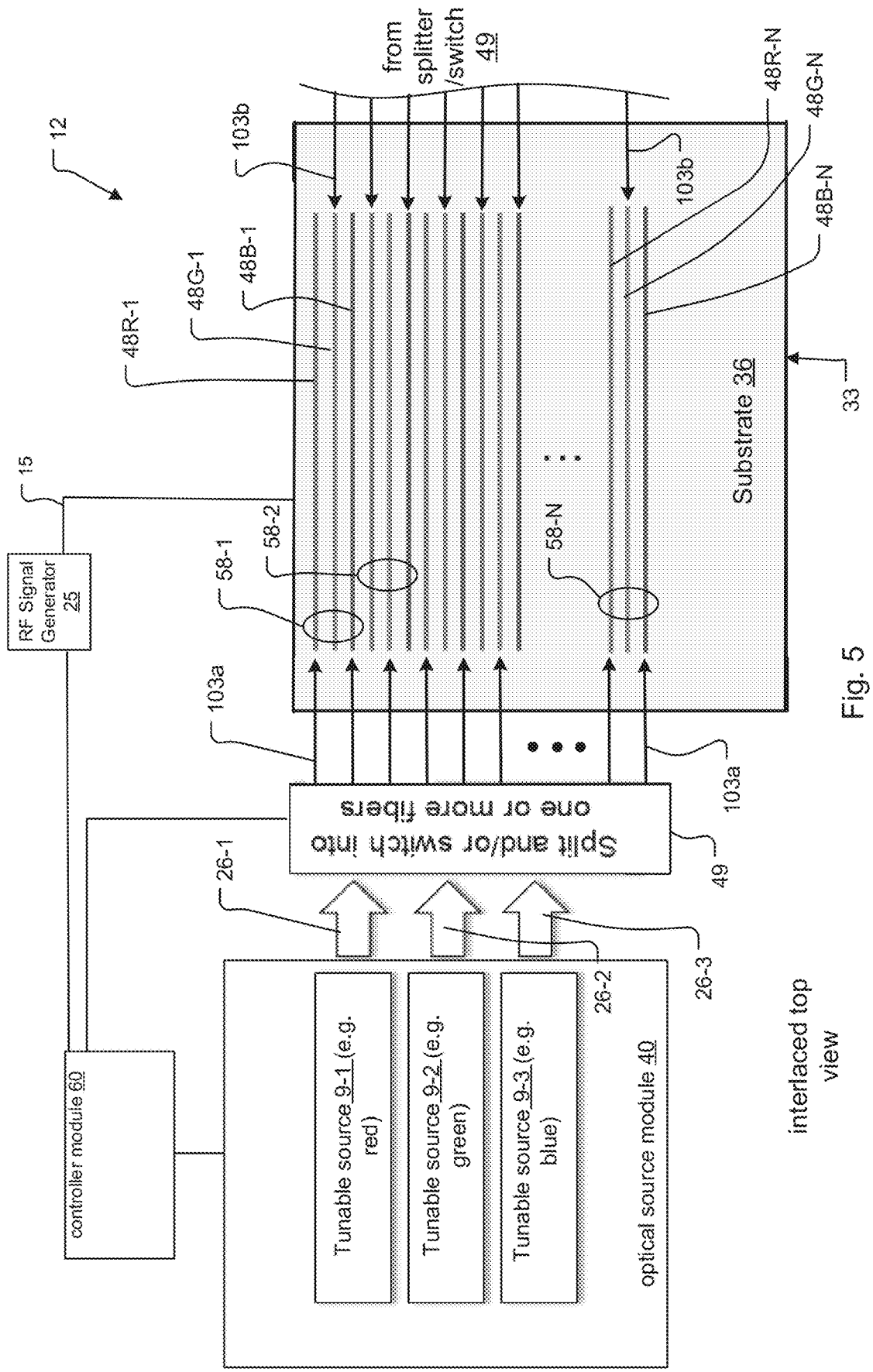

SYSTEM AND METHOD FOR DIFFRACTIVE STEERING OF ELECTROMAGNETIC RADIATION

RELATED APPLICATIONS

This application claims the benefit under 35 USC 119(e) of U.S. Provisional Application No. 62/564,548, filed on Sep. 28, 2017, which is incorporated herein by reference in its entirety.

BACKGROUND OF THE INVENTION

Acousto-optic modulators (AOMs) are a type of diffractive modulator that use diffraction to direct light. They show promise as components of light display systems for generating light fields as are required for holographic displays and other applications. One class of AOMs are termed surface acoustic wave (SAW) optical modulators. These modulators can provide controllable sub-holograms from which a light field can be constructed.

One type of SAW modulator is the guided-to-leaky-mode device fabricated using lithium niobate as described, for example, in Hinkov et al., *Collinear Acoustooptical TM-TE Mode Conversion in Proton Exchanged Ti:LiNbO3 Waveguide Structures*, J. Lightwave Tech., vol. 6(6), pp. 900-08 (1988), Smalley et al., Anisotropic leaky-mode modulator for holographic video displays, Nature, vol. 498, pp. 313-317 (2013), herein after "Smalley"; McLaughlin et al., *Optimized guided-to-leaky-mode device for graphics processing unit controlled frequency division of color*, Appl. Opt., vol. 54(12), pp. 3732-36 (2015), Qaderi et al., *Leaky-mode waveguide modulators with high deflection angle for use in holographic video displays*, Opt. Expr., vol. 24(18), pp. 20831-41 (2016), hereinafter "Qaderi"; and Savidis et al., *Progress in fabrication of waveguide spatial light modulators via femtosecond laser micromachining*, Proc. of SPIE Vol. 10115, 2017.

In these SAW modulators, surface acoustic waves (SAWs) diffract light propagating in the modulators' waveguides and cause at least some of the light to change from guided modes to leaky modes that exit the waveguides at angles dictated in part by the frequency of the light and the frequency of the SAWs.

A benefit of SAW-based light field generators is that they can be designed to project light of various intensities as a function of angle, simultaneously, for each emissive region. This is different than the majority of 3-D display technologies, such as lenticular and integral photography displays, which use spatial multiplexing: each display pixel is divided into subpixels with different emission directions, disadvantageously trading off spatial resolution and direction resolution.

SUMMARY OF THE INVENTION

Existing diffractive modulators, specifically those which steer or otherwise shape light, have long been known to suffer disadvantages including: narrow beam steering angle, discretized rather than continuous selection of steering angle(s), unintentional broadening of a single output "ray," and excessive device volume.

The present invention generally exploits the wavelength dependence of diffractive phenomena in the context of acousto-optic modulators, such as SAW modulators. Benefits include: broadening of the scanned angle of modulated light, and obtaining a high angular dynamic range (fine control over a large range). These benefits can be achieved despite the practical limits of today's tunable illumination sources by: 1) combining radio frequency (RF) and wavelength-driven steering, 2) using modulator families that are natively "flat" (e.g., diffraction gratings and SAW modulators), and/or 3) in the field of visual display, using metamerism to minimize the perceptual artifacts of wavelength modulation.

To provide the advantages described above, we propose diffractive light steering systems, which could be used as a component of light field generators of possibly holographic displays, for example. That said, the principles presented here have additional applications beyond holographic displays to other system that must steer light.

In these diffractive steering systems, the wavelength of light and possibly the frequency/wavelength of RF drive signals are modulated. A diffractive structure is then used to transmit or reflect the light out of the system. In examples, the diffractive structure can be a grating, a diffractive lens, and/or an acoustic wave within a SAW modulator (or other acousto-optic modulator), or other known diffractive structures. The system leverages the chromatic dispersive qualities of these structures to improve the angular dynamic range.

In general, according to one aspect, the invention features a light steering system. This system comprises a diffractive modulator, such as an acousto optic modulators or specifically a SAW modulator, that steers light using diffraction, a multiwavelength light source that generates light at different wavelengths for input into the diffractive modulator. A controller then controls a wavelength of light generated by the tunable light source to control an angle of light emitted from the diffractive modulator.

Typically, the multiwavelength light source generates light that is tunable over a wavelength range of greater than 5 nanometers.

Preferably one or more transmissive or reflective gratings, or other chromatically dispersive optical elements, are used for amplifying a steered angle of the light.

In general, according to another aspect, the invention features a light steering method. This method comprises steering light by diffraction, and changing a wavelength of the light over a range of wavelengths to control an angle of light emitted.

In general, according to another aspect, the invention features a multi color light field generator system. This system comprises an array of modulators with respective waveguides and a multi wavelength optical source that generates light over a range of wavelengths for input into the waveguides. A controller module for controlling wavelengths of light generated by the multi wavelength light source to control an angle of light emitted from the modulators.

For a typically visual display, the waveguides accept and transmit light different primary colors of a primary color group, such as a red, green and blue. Preferably, the waveguides are arranged in banks.

A splitter/switch that splits, switches, and/or combines the light such that the light provided to the waveguides can be used. Moreover, the splitter/switch might route/direct the light such that the light enters the waveguides from the same side of a substrate in which the waveguides are formed or from different sides of the substrate.

In general, according to another aspect, the invention features a method for generating a multi color light field, comprising generating light over a range of wavelengths for input into waveguides of diffractive modulators and controlling wavelengths of light to control an angle of light emitted from the modulators.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 shows another RGB light field generator system where the light signals are instead applied to the display in an interlaced fashion;

FIG. 6A illustrates varying the wavelength of light signals entering the SAW modulators of the systems, while maintaining a constant frequency for RF drive signals applied to the SAW modulators; FIG. 6B represents a conventional approach of maintaining a fixed wavelength for the light signals while varying the frequency of the RF drive signals; and FIG. 6C represents a hybrid approach that varies both the wavelength of the light signals and the frequency of the RF drive signals;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
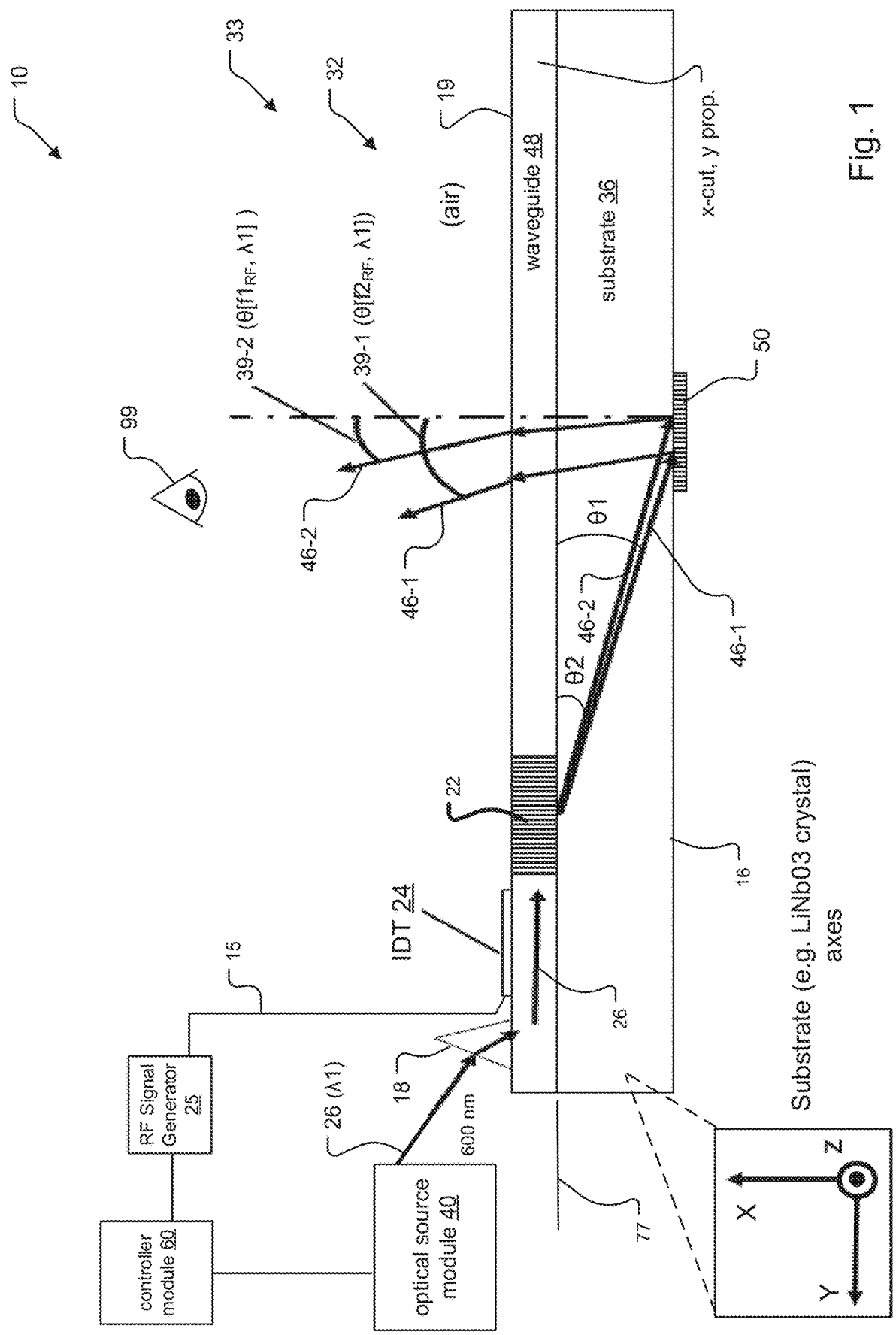
FIG. 1 is a schematic block diagram of a light steering system, showing a side view of a leaky-mode SAW modulator within the light steering system, where radio frequency (RF) drive signals modulate the amplitude and the angle of light exiting from the SAW modulator.

FIG. 1 shows a side view of a leaky-mode SAW modulator 32 within a light steering system 10. The purpose of the figure is to illustrate the construction and operation of the SAW modulator, but also to illustrate why varying the RF drive signal frequency is a poor approach to changing the angle at which the light is emitted from the modulator 32.

Concerning construction, the SAW modulator 32 is formed from a substrate 36 that is preferably made of a piezoelectric material such as lithium niobate, in one example. The substrate 36 can be manufactured entirely of the piezoelectric material, or the piezoelectric material can be deposited upon or bonded to a different material, in examples.

Typically, the substrate 36 includes an array of SAW modulators, arrayed next to each other, side-by-side, extending into the plane of the figure. In the typical substrate, there would be more than 3-5 modulators. At higher levels of integration, possibly 10, 20, or 50 or more modulators are formed in the substrate 36.

The illustrated SAW modulator 32, as with the other modulators in the substrate 36, includes an interdigital transducer (IDT) 24 and at least one waveguide 48. The IDT 24 and waveguide(s) 48 are typically either formed within or patterned upon the surface 19 of the substrate 36. Each waveguide can transmit one, several, or a continuum of wavelengths. For example, the capability of a single waveguide in a leaky-mode SAW modulator to separately modulate red, green, and blue light for a visual display application is described in Smalley.

The multiple waveguides formed within the substrate 36 are typically configured for different wavelengths of light, such as red, green and blue for a visual display system, such as a holographic display. The waveguides 48 are typically a proton-exchanged ion channel or laser micromachined region formed on the substrate 36.

There are three common light emission configurations of the SAW modulator 32 in terms of how the light exits the modulators. The three configurations are: light exiting from a surface that is principally parallel to the waveguide (face-fire), light exiting from a surface that is perpendicular to the waveguide (edge-fire), and intermediate cases.

The illustrated example shows a face-fire configuration. When employing this configuration the SAW modulator 32 also preferably includes a reflective diffraction grating 50. In the illustrated example, the reflective diffraction grating 50 is bonded to, patterned into or formed upon the face of the substrate 36 that is opposite the waveguide 48. This placement of the reflective diffraction grating 50 enables light that exits the waveguide 48 to be reflected out of the system 10 at face 19, which is proximal to the waveguide 48.

In the particular example, a source of illumination such as an optical source module 40 provides light signals 26 to the SAW modulator 32. An in-coupling prism 18 is placed upon the surface 19 of the SAW modulator 32 and couples the light signals 26 into the optical waveguide 48. Other coupling mechanisms can be used, however. A short list includes butt-coupled fibers, in-coupling gratings and in-couple of free space propagating light. The optical source module 40 is often a laser such that the light signals 26 are of the same wavelength.

In operation, an RF signal generator 25 connects to the IDT 24. An RF drive signal 15 generated by the RF signal generator 25 is applied to the IDT 24 through intervening RF feedlines. Due to the piezoelectric properties of the substrate 36, the RF drive signal 15 causes the IDT 24 to induce a surface acoustic wave (SAW) 22 traveling chiefly through the waveguide 48. In the illustrated example, the SAW 22 and the RF drive signal 15 would be composite waveforms having two frequency components giving rise to two beams of exit light signals 46-1 and 46-2 at different angles relative to normal N to the substrate.

In the illustrated example, the RF drive signal 15 has two frequency components, which are applied to the IDT 24. This is simply illustrative. In a typical operational mode, the RF signal might be at one frequency, several frequencies, or an arbitrary waveform spanning a spectral band.

The SAW interacts with and diffracts the light in the waveguide 48. This interaction is characteristic of a diffractive modulator. And, due to this interaction, some of the light will be redirected at an angle that depends partially on the frequency components of the RF drive signal 15 applied to the IDT 24.

In more detail, using a specific example, light signals 26 of a fixed wavelength are introduced to a leaky mode, lithium niobate SAW modulator 32 in an X-cut Y-propagating configuration. Lithium niobate is grown in a single crystal using a variety of techniques, such as the Czochralski process. The crystal is then cut into wafers for processing. X-cut lithium niobate refers to the crystallographic axis perpendicular to the face of the wafer after the cut-process. Y-propagating refers to the crystallographic axis along which the waveguide and the SAWs propagate. A detailed description of the naming convention as referenced to crystal unit cell can be found in Wong, K. K. (2002). Properties of Lithium Niobate. London, United Kingdom: INSPEC. p. 8. ISBN 0 85296 799 3 (page 11).

To illustrate the relationship between the RE drive signal frequency and the direction of exit light, an RF drive signal 15 having two frequency components is applied to the IDT 24. The light signals 26 have a wavelength of 600 nanometers (nm). The two frequency components have frequencies of 275 MegaHertz (MHz) and 375 MHz. The difference between the frequencies represents a 100 MHz change in drive signal frequency, and thus this example illustrates the outer limits of the range of angles achievable with 100 MHz of RF bandwidth. The RF drive signal 15 then excites a SAW 22, which is formed from the two frequency components of the RF drive signal 15. The light signals 26 travel in a collinear fashion with the SAW 22 along the length of the waveguide 48. The waveguide 48 typically provides confinement of the light signals 26 in a TE (transverse electric) guided mode of the waveguide 48.

Within the waveguide 48, the light signals 26 interact with the SAW 22 to convert part of the light to transverse magnetic (TM) polarization. Due to birefringence of the waveguide 48 and the substrate 36, and/or a wavenumber change due to SAW diffraction, the TM polarized light signals are in leaky mode(s) of the waveguide 48. Light of the leaky modes enters the bulk substrate 36 as diffracted light signals 46-1 and 46-2 at different diffraction angles $\theta 1$ and $\theta 2$, respectively, relative to grazing 77. In particular, light signals 46-1 enters the substrate 36 at deflection angle $\theta 1$ are based upon the 275 MHz frequency component of the RF drive signal 15/SAW 22, and light signals 46-2 enters the substrate 36 at deflection angle $\theta 2$ based upon the 375 MHz frequency component of the RF drive signal 15/SAW 22.

The light signals 46-1 and 46-2 then propagate within the substrate 36 and are diffracted in a substantially consistent fashion by the reflective diffractive grating 50. The light signals 46-1 and 46-2 are diffracted to essentially the same degree because the light signals 46 were formed from light signals 26 of the same wavelength.

The light signals 46-1 and 46-2 are then emitted at exit angles 39-1 and 39-2, In general, the SAW 22 imparts a first small deflection due to diffraction, the grating 50 imparts a reflection (possibly with "power"), and the light's angle changes again when it exits into air due to refraction at the air-substrate interface of the proximal face 19. The light signals 46-1 and 46-2 might then be viewed by an observer 99.

The scanned angle is the difference between the exit angles 39-2 and 39-1 and provides a measure of the ability for the light steering system 10 to steer light for a given RF drive signal bandwidth. Using the parameters of the specific example hereinabove, the 100 MHz bandwidth in RF drive signal 15 will steer light signals 26 of wavelength 600 nm at a scanned angle of approximately 0.86° in air. This value 0.86° for the scanned angle is calculated via the equation below, which assumes a SAW 22 velocity of 4 km/s:

$$\Delta k[y]/k = (100 \text{ MHz}/(4 \text{ km/s})) \times 600 \text{ nm} = 0.015 \text{ rad} = 0.86°.$$

Here, k is the wavenumber of light in air (the reciprocal of its wavelength), $\Delta k[y]$ is the change in the wavevector component along the y (propagation) direction effected by diffraction off the SAW 22, and the formulas assume that the light 46 exits near the wafer normal.

That is, the difference between exit angle 39-1 (e.g. $\theta[f1_{RF}, \lambda 1]$) and 39-2 (e.g. $\theta[f2_{RF}, \lambda 1]$) produces a scanned angle of 0.86° when only RF modulation is employed:

$$\theta[f1_{RF}, \lambda 1] - \theta[f2_{RF}, \lambda 1] = 0.86°$$

The notation $\theta[f1_{RF}, \lambda 1]$ indicates that the angle $\theta$ is both a function of the frequency of the RF drive signals 15 and the wavelength of the light signals 26.

Figure 2:
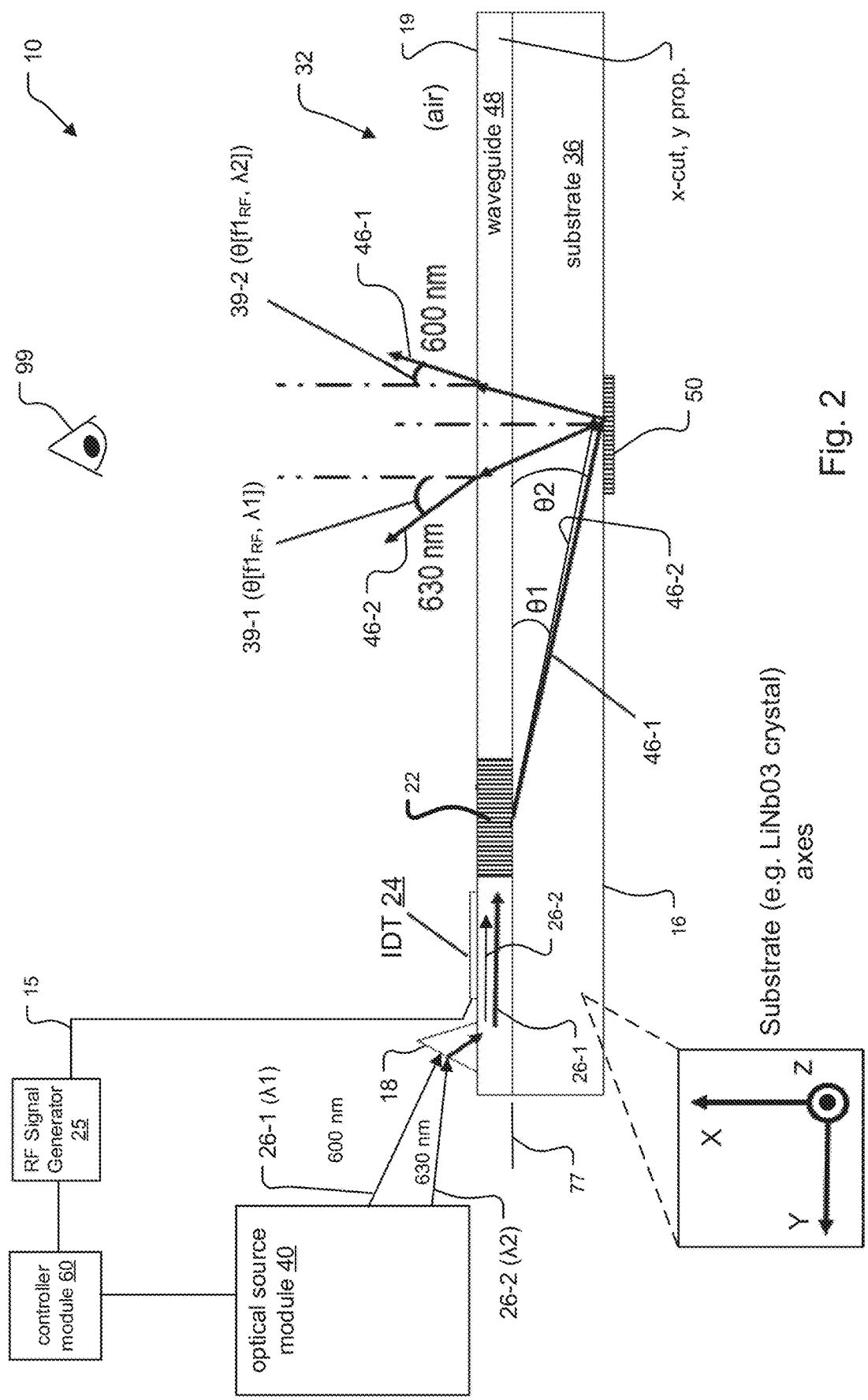
FIG. 2 is a schematic block diagram of a light steering system that is similar to that of FIG. 1, where radio frequency (RF) drive signals modulate the amplitude and the angle of the exiting light.

FIG. 2 shows another light steering system 10 according to an embodiment of the invention. Also based on a diffractive SAW modulator 32, the system is characterized by a multiwavelength, such as tunable, optical source module 40 that generates light at different wavelengths for input into the SAW modulator. In some cases, these different wavelengths are generated simultaneously. In other cases, they are generated serially, in time.

Further, a controller 60 controls the multiwavelength optical source module 40 and the wavelength or wavelengths of light it generates to control an angle of light emitted from the diffractive modulator 32.

Typically, and here again, the substrate 36 includes an array of the SAW modulators 10, arrayed next to each other, side-by-side, extending into the plane of the figure. In the typical substrate, there would be more than 3-5 modulators. At higher levels of integration, possibly 10, 20, or 50 or more modulators are formed in the substrate 36. In this way, the light steering system forms a display module 33, that might be a stand-alone device or further integrated with other display modules in order to form a larger display system such as a holographic display system.

In more detail, as in FIG. 1, a reflective diffraction grating 50 is installed opposite at an exit face, such as opposite to proximal face 19. Preferably, the diffraction grating has a spatial frequency of greater than 1000 lines/mm. It will typically have a frequency of about 4000 lines/mm or more. In general, however, in this embodiment, a key characteristic of the diffraction grating is that it is an optical element that is chromatically dispersive. The effect is exploited to convert changes in wavelength into changes in the angle of light exiting the system. Thus, in other examples, the reflective grating is replaced with a transmissive grating or other chromatically dispersive optical element.

To illustrate its operation, light signals 26-1, 26-2 of different wavelengths, such as the two wavelengths illustrated, and an RF drive signal 15 of a single frequency are provided as input to the SAW modulator 32. The RF drive signal 15 causes the IDT 24 to induce a narrowband (single-wavelength) SAW 22 within the waveguide 48.

The multiwavelength optical source module 40 might include: 1) multiple non-tunable, e.g., laser, sources at different wavelengths, or 2) one or more tunable, e.g., tunable laser, sources, for example.

The light steering system 10 operates as follows. Light signals 26-1 and 26-2 of different wavelengths, enter the waveguide 48 via the in-coupling prism 18 or other in-coupling device. The light signals 26-1 and 26-2 are diffracted by the SAW 22 into the substrate 36 as diffracted light signals 46-1 and 46-2 at diffraction angles θ1 and θ2 relative to grazing 77, respectively. The values of diffraction angles θ1 and θ2 are slightly different due to the difference in wavelength of the light signals 46-1 and 46-2.

The light signals 46 then propagate within the substrate 36 and are diffracted by the reflective diffractive grating 50. Because the light signals 46-1 and 46-2 are of different wavelengths, the reflective diffractive grating 50 diffracts the light signals 46-1 and 46-2 differently due to its chromatic dispersion. The reflective diffractive grating 50 then reflects the light signals 46-1 and 46-2 towards the surface 19 at exit angles 39-1 and 39-2. However, compared to the embodiment of FIG. 1, exit angles 39-1 and 39-2 in general exhibit an higher angular dynamic range from each other, due to the wavelength-dispersive effect of SAW and the grating 50.

Thus, the illustrated system 10 can provide higher angular range of the exit light signals 46 over the previous example.

Consider the case where the light signals 26-1 and 26-2 have wavelengths of 600 nm and 630 nm; the difference in wavelength between the light signals 26-1 (600 nm) and 26-2 (630 nm) is 30 nm, which corresponds to an optical frequency shift of 25 THz. The optical frequency shift of 25 THz between the light signals 26-1 and 26-2 will correspondingly steer the light signals 46 by approximately 6.3° for a SAW of approximately the same period as the SAW 22 induced in the embodiment of FIG. 1.

This figure 6.3° is calculated by assuming that the guided mode effective refractive index in the waveguide 48 is 2.2:

$$\Delta k[y]k=(25 \text{ THz}/(c/2.2))\times 615 \text{ nm}=0.11 \text{ rad}=6.3°.$$

where c is the speed of light in vacuum, and where some small correction terms were discarded.

That is, the difference between exit angle 39-1 (e.g. $\theta[f1_{RF}, \lambda 1]$) and 39-2 (e.g.) $\theta[f1_{RF}, \lambda 2]$) produces a scanned angle of 6.3° when only illumination wavelength modulation is employed:

$$\theta[f1_{RF},\lambda 1]-\theta[f1_{RF},\lambda 2]=6.33.$$

In this example, the reflective diffraction grating 50 performs the majority of the angle-steering because it is assumed to be of significantly higher spatial frequency than the SAW 22. For example, a 300 MHz SAW traveling at 4 km/s has a spatial frequency of 75/mm, whereas a diffraction grating that rotates 600 nm light from near-grazing to normal in a medium of index 2.3 has spatial frequency of 4000/mm.

A comparison between wavelength-tuning of FIG. 2 and RF frequency tuning of FIG. 1 is now described. The wavelength tuning embodiment of FIG. 2 not only affords a wider range of angles, but also uses a much smaller fractional frequency bandwidth to do so: (25 THz/500 THz) ≈5%, whereas (100 MHz/375 MHz) 27%. A small fractional frequency bandwidth is advantageous for many aspects of system design, such as for efficient coupling of waves into the waveguide 48.

Having illustrated the basic concept for the embodiment of FIG. 2 hereinabove, another example that more precisely estimates the angular steering/scanning angle capability of the embodiment of FIG. 2 follows. In this example, assume the following: 1) a lithium niobate SAW modulator 32 has a 2.2 guided-mode effective index of refraction; 2) a 2.2865 substrate index; 3) a constant RF drive signal 15 frequency of 350 MHz (to induce a SAW 22) is applied to the IDT 24; 4) a (−1) order diffraction off of the SAW signals 22 for the light signals 46 (where the −1 order is deflected more towards vertical and the ±1 order is closer to the original waveguide propagation direction); 5) light signals 26-1 and 26-2 of 600 nm and 630 nm are provided to the in-coupling prism 18; 6) and, any effects from dispersion of the effective index and substrate index are discounted.

In more detail, when the optical source module 40 generates light signals 26-1 at a wavelength of 600 nm, the light signals 26-1 within the waveguide 48 will diffract into the substrate 36 at diffraction angle θ1, with value 20.08° from grazing 77. In contrast, when optical source module 40 operates at 630 nm, the light signals 26-2 within the waveguide 48 will diffract into the substrate 36 at diffraction angle θ2, with value 20.27° from grazing 77. Assuming the reflective diffraction grating 50 has a spatial frequency of 3.5 lines/micron, the 600 nm light signals 46-1 will transmit out of the surface 19 at exit angle 39-1 with value +2.72° in air, and the 630 nm light signals will transmit at exit angle 39-2 with value −3.44° in air. This is a swing (e.g. scanned angle) of 6.2°.

The controller 40 can exploit this behavior in a number of possible modes of operation. In one mode, the controller 40 controls the multiwavelength optical source module 40 to generate multiple narrowband optical signals 46 at different wavelengths into each waveguide 48 of each SAW modulator 10 formed in the substrate 36. Due to the chromatic dispersion of the SAWs 22 and any optical elements, such as reflective grating 50, the optical signals will exit the SAW modulators 10 at different angles.

For the purposes of this discussion, narrowband means a full width half maximum (FWHM) bandwidth of less than 1 nm and typically 0.5 nm or less. On the other hand, the narrowband optical signals differ in wavelength with respect to each other often by greater than 5 nanometers or more, such as greater than 10 nm, or 20 nm or 30 nm or more.

In another operation mode, the controller 40 controls the multiwavelength optical source module 40 to generate a swept narrowband optical signals 46 that sweeps through over a wavelength band, such as a band that is greater than 5 nanometers or more, such as greater than 10 nm, or 20 nm or 30 nm or more. This will result in the output optical signals sweeping through a range of angles.

In another operation mode, the controller 40 controls the multiwavelength optical source module 40 to step the narrowband optical signals 46 in discrete wavelengths steps of such as 0.5 nm or 1 nm or more through a wavelength band, such as a band that is greater than 5 nanometers or more, such as greater than 10 nm, or 20 nm or 30 nm or more. This will result in the output optical signals stepping through a range of angles.

In another operation mode, the controller 40 controls the multiwavelength optical source module 40 to generate a wideband optical signal 46, which has a bandwidth of greater than 5 nanometers (FWHM) or more, such as greater than 10 nm, or 20 nm or 30 nm or more. This will result in output fan of exit light existing across a continuous range of angles.

It should be noted that in all of these modes of operation, the controller module 60 will often further control the frequency of the RF drive signals 15 produced by the RF drive circuit 25 in order to further control, such as provide fine control over, the angle of the exit light 46.

This arrangement and these modes of operation can be employed, for example, in a holographic display through arrangements of tiling (etc.) as disclosed in the following references: U.S. patent application Ser. No. 15/976,431, filed May 10, 2018; U.S. patent application Ser. No. 15/989,437, filed May 25, 2018 entitled "SAW Modulators with Phase and Angle Selective Optical Coatings"; and U.S. patent application Ser. No. 16/041,028; filed Jul. 20, 2018, entitled "Systems and Methods for Light Field Generation."

Also, more importantly, a telescope array as disclosed in reference U.S. patent application Ser. No. 16/041,040, filing date Jul. 20, 2018, entitled "Telescope Arrays and Superimposed Volume Gratings for Light Field Generation" can be incorporated into the SAW modulator 32 of FIG. 1 and FIG. 2. Two additional embodiments that result from incorporating the aspects of these telescope arrays into the SAW modulators are shown in FIGS. 3A and 3B.

Figure 3A:
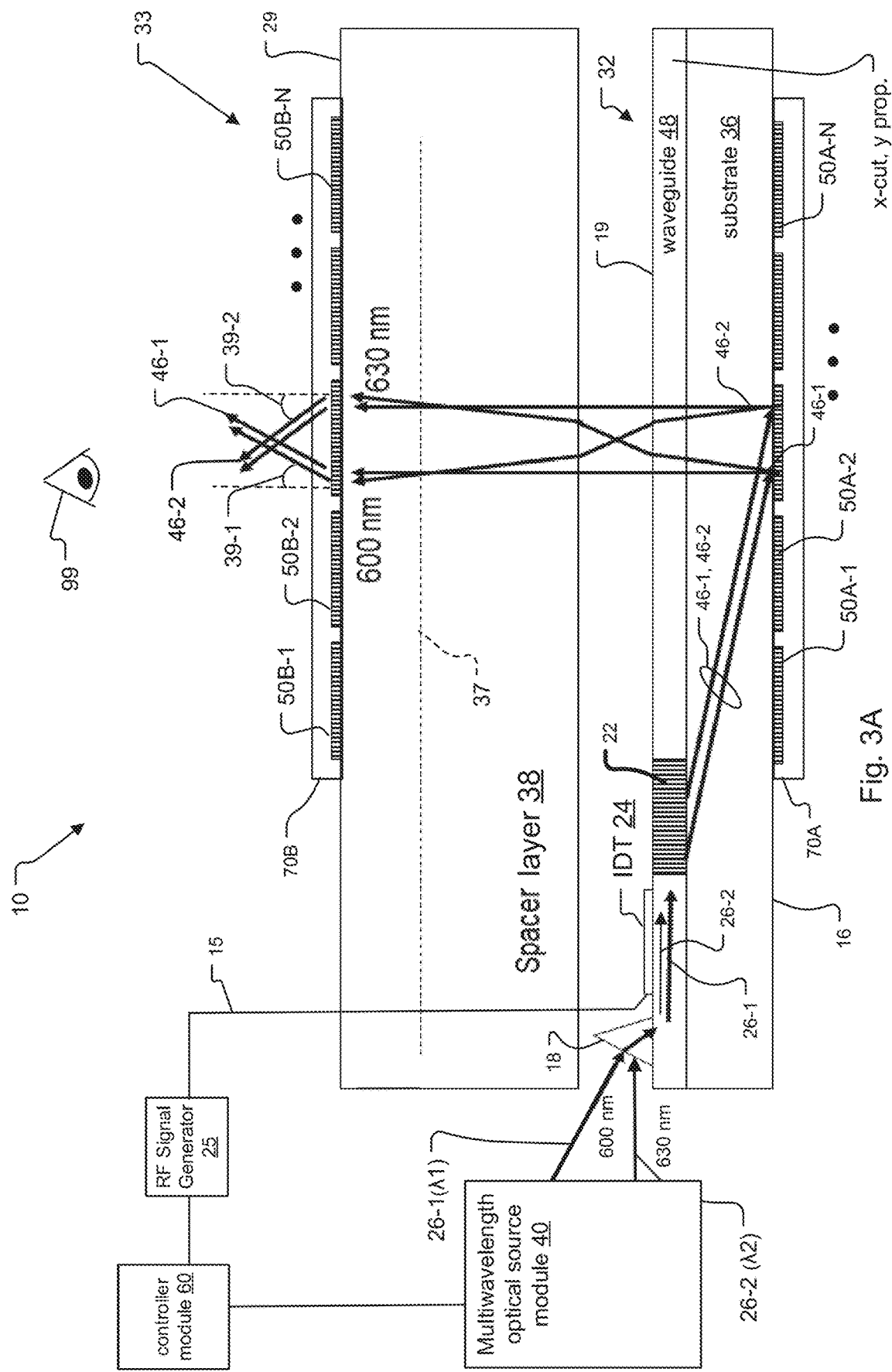
FIG. 3A is a schematic block diagram of a light steering system having a telescope array with two layers of diffractive lenses to redirect and increase the angular extent of light signals emitted from the SAW modulator and showing a side view of the SAW modulator with a spacer layer placed upon or near a top face of the SAW modulator.
Figure 3B:
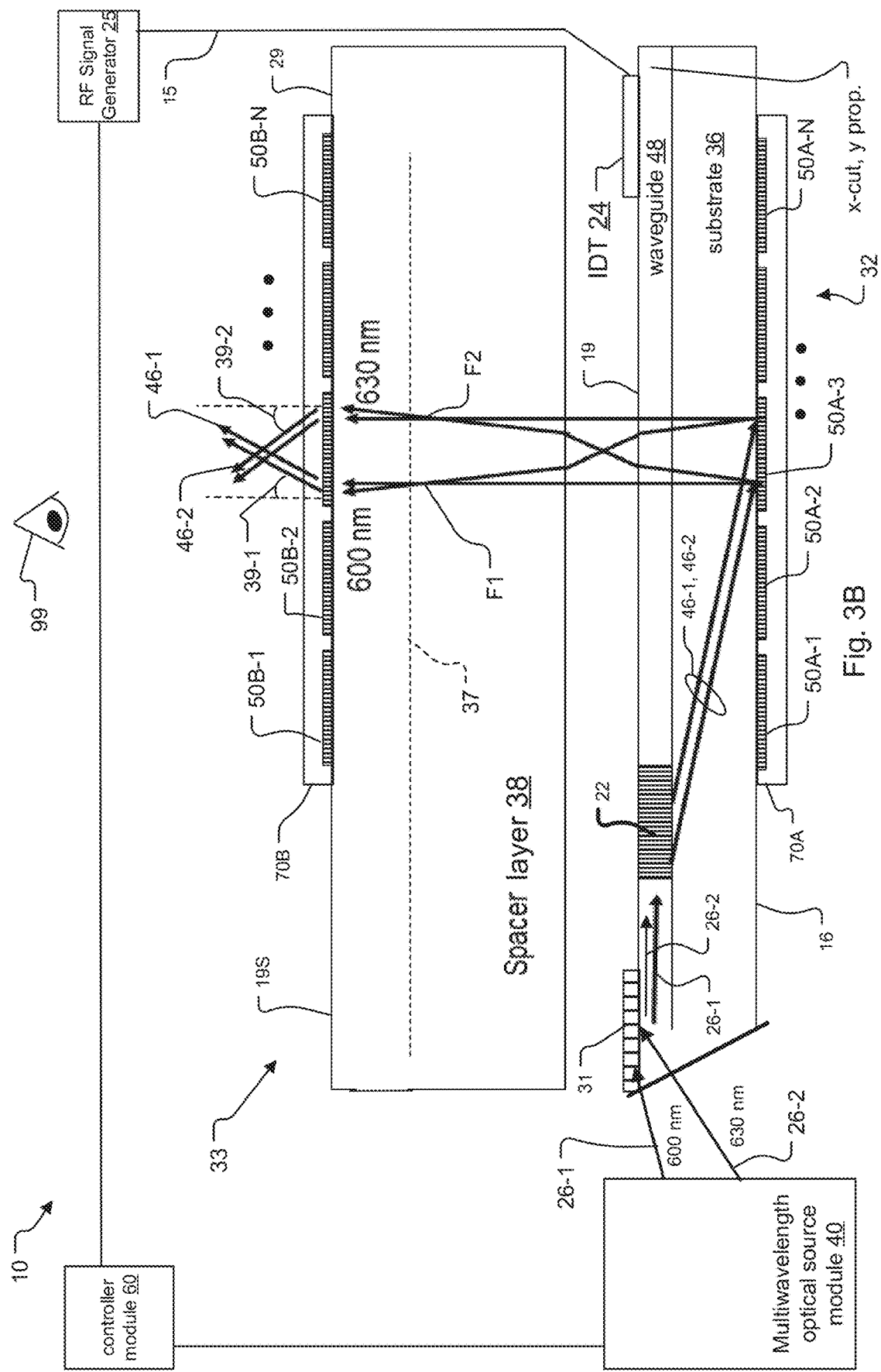
FIG. 3B is a schematic block diagram of a light steering system, which is similar to that of FIG. 3A, where the light signals and RF drive signals are introduced to opposing ends of the SAW modulator.

FIG. 3A illustrates a light steering system 10, according to another embodiment of the invention.

The display module 33 includes an added spacer layer 38 extending parallel to the surface 19 of substrate 36 and the exemplary SAW modulator 32. The spacer layer 38 may be made from any convenient transparent material, such as glass.

The SAW modulator 32 along with the other modulators in the substrate 36 and the spacer layer 38 each include an array of lenses that collectively form a telescope array. In general, the telescope can include elements on either face of the spacer 38 and/or either face of the substrate 36, or even within the spacer and/or substrate.

In the illustrated example, the telescope array is formed from an objective lens array 70A of the exemplary SAW modulator 32 and an eyepiece lens array 70B of the spacer layer 38, The objective lens array 70A is bonded to, formed within or deposited upon a distal face 16 of the SAW modulator 32 that is opposite to the proximal face 19 of the SAW modulator 32. The eyepiece lens array 70B, in turn, is bonded to, formed within or deposited upon a surface 29 of the spacer layer 38. The objective lens array 70A has array elements 50-A1 through 50A-N, where the array elements are preferably chirped reflective diffraction gratings similar to the reflective diffraction gratings 50 of FIG. 1 and FIG. 2, in one example. The eyepiece lens array 70B has array elements 50-B1 through 50B-N, where the array elements are preferably transmissive diffraction gratings, for example.

In a preferred embodiment, the objective lens array elements 50A are diffractive, and highly off-centered, such that they are not only performing the focusing function of a telescope lens, but also provide the same light redirection and wavelength-dispersion function as the reflective diffraction gratings 50 in the embodiment of FIG. 2. Each objective lens array element 50A is paired with an associated eyepiece lens array element 50B to form a notional telescope.

Light signals 26-1 and 26-2 are injected into the waveguide 48 via in-coupling prism 18. The light signals 26-1 and 26-2 of the different wavelengths are diffracted by the SAW 22 and are coupled out of the waveguide 48 and into the substrate 36 as light signals 46-1 and 46-2. The light signals 46-1 and 46-2 may travel in slightly different trajectories but practically overlap within the substrate 36 (i.e. the light signals 46-1 and 46-2 are diffracted out of the waveguide 38 and into the substrate 36 at virtually the same angle). Thus, the two arrows representing light exiting the waveguide 48 on the path to the grating 50A-3 do not represent the two different wavelengths but simply the extent of the beam of light exiting the waveguide.

After diffraction from the reflective diffraction gratings 50A, the light signals 46-1 and 46-2 then enter the spacer layer 38 following paths that now diverge from each other to the dispersion of the grating 50A-3, for example. The light signals 46-1 and 46-2 are focused at a focal plane 37 with a different focal point for each of the wavelengths. Focal point F1 corresponds to the focus of the 600 nm light; and focal point F2 corresponds to the focus of the 630 nm light. F1 and F2 are within the spacer layer 38. The light signals 46-1 and 46-2 enter an eyepiece lens array element 50B of the eyepiece lens array 70B. The light signals 46-1 and 46-2 then exit the spacer layer 38 at exit angles 39-1 and 39-2, respectively, for viewing by an observer 99.

The increase in the angular extent of the light signals 46-1/46-2 observed after the surface 29 of the spacer layer 38 can be greater than that provided by the light steering system of FIG. 2. This is due to the use of the lenses and the concomitant dispersion. These lenses provide pixelated demagnification of the light signals 46 that exit the surface 19 of the SAW modulator 32 and then enter the spacer layer 38.

FIG. 3B illustrates a light steering system 10, according to yet another embodiment of the invention.

An in-coupling grating 31 replaces the in-coupling prism 18 of FIG. 3A. In addition, the DT 24 is located at an end of the SAW modulator 32 that is opposite where the in-coupling grating 31 is located. As a result, the SAW signal 32 produced from the IDT 24 and the light signals 26 within the waveguide 48 are counter-propagating within the waveguide 48. Otherwise, the SAW modulator 32 and the system 10 operate in a substantially similar manner as the SAW modulator 32 and system 10 in the embodiment of FIG. 3A.

Figure 3C:
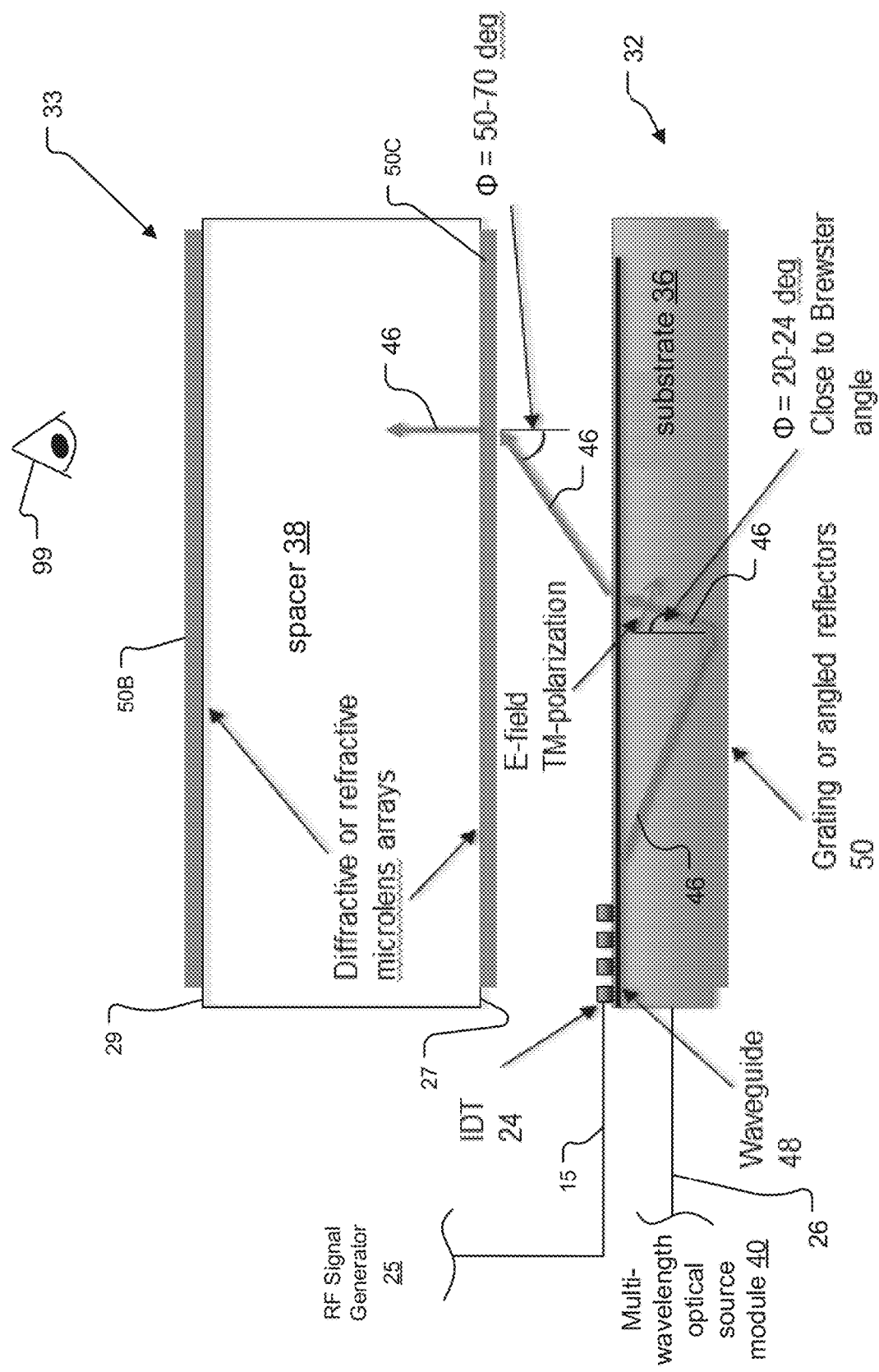
FIG. 3C shows a partial cross-sectional side view of a light steering system, which is also similar to that of FIG. 3A, where the SAW modulator and spacer layer are preferably constructed to operate when the light signals are transmitted within a substrate material oft SAW modulator at the Brewster angle.

FIG. 3C shows a portion of a light steering system 10, according to yet another embodiment of the invention.

In this configuration of the SAW modulator 32, the rays of light signals 26 are diffracted by the SAW to form light signals 46 within the substrate 36 as in FIG. 3A/3B; however, the modulated light signals 46 are redirected toward the top surface 19 of the LiNbO3-based SAW modulator 32 at angle φ, which is at or near the Brewster angle. A reflective diffractive grating 50 or angled reflector redirects the modulated light signals 46 towards the top surface 19. Here, the Brewster angle is approximately 20-24 degrees from normal for the light signals 46 exiting the LiNbO3 substrate 36 into air. In contrast, the modulated light signals 46 in the SAW modulators 32 of FIG. 3A/3B redirect the signals at close to normal.

This enables light to exit the top surface 19 of the LiNbO3 SAW modulator 32 with very low reflection, 0% at the Brewster angle compared to approximately 16% at normal incidence, without the need for an antireflective coating at the surface 19. Low reflectivity at or near the Brewster angle requires the light incident on the interface to be TM-polarized (E-field in the plane of incidence and H-field parallel to the interface). Reducing reflections is important for preventing emission of stray light rays at unwanted angles and locations from the SAW modulator 32.

Directing light to exit the SAW modulator 32 at or near the Brewster angle results in the exiting optical rays of the light signals 46 to propagate at 50-70 degrees from normal in air. If the optical ray enters the spacer 38 material above the LiNbO₃ SAW modulator 32, a diffractive or refractive microlens array 50C located on the proximal surface 27 of the spacer layer 38 can be designed to bend the rays of the light signals 46 back to approximately normal inside the spacer layer 38. A diffractive or refractive microlens array 50B located at a distal surface 29 of the spacer layer then enables transmission of the light signals 46 for viewing by an observer 99.

The E-field orientation is also reflected in the figure. The E-field is preferably TM-polarized.

Figure 4:
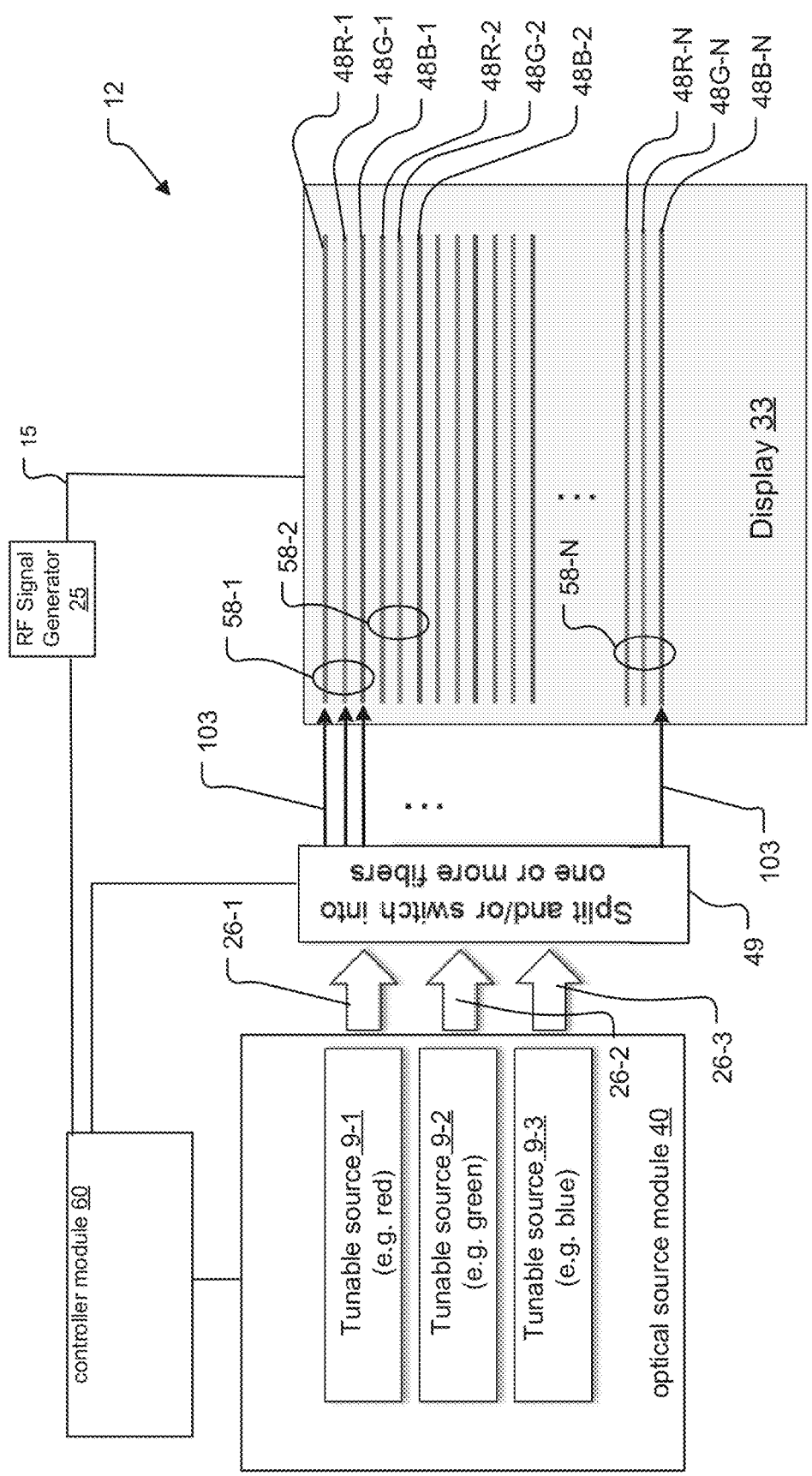
FIG. 4 is a schematic block diagram of a Red/Green/Blue (RGB) light field generator system in which the light signals are applied to the same side of the display.

FIG. 4 illustrates an RGB light field generator system 12 of the invention.

The RGB light field generator system 12 includes the controller module 60, the optical source module 40, a splitter/switch 49, and a substrate 36 that includes arrays of SAW modulators to form a display module 33.

The multiwavelength optical source module 40 here includes tunable sources 9-1, 9-2, and 9-3. The tunable sources 9-1/9-2/9-3, in one example, provide corresponding narrow band light signals 26-1/26-2/26-3 of different primary color group, such as red, green, and blue wavelengths of light. The optical source module 40 and the splitter/switch 49 are under control of the controller module 60 as is the RF drive circuit 25.

(Note that the substrate 36 includes an array of SAW modulators 32 configured as described in any of FIGS. 2 through 3C along with possibly the spacer 38. Each SAW modulator includes respective in-coupling devices 18, IDTs 24, waveguides 48 (shown) and possibly objective lens arrays 70A and eyepiece lens arrays 70B as described previously. That said, for clarity, FIGS. 4 and 5 only show the waveguides 48 of these SAW modulators in order to emphasize the description concerning the controller module 60, multiwavelength optical source 40, and RF drive circuit 24, among other aspects.)

The operational wavelength range of a light field generator system 12 will depend on the application of the system. In the case of an RGB light field generator system 12 having a color 3-D display 33, each of the tunable light source 9-1/9-2/9-3 typically has a very wide wavelength tunability. In one example, the wavelength tenability is a range of 10-30 nm, depending on center wavelengths. In one example, the tunable sources 9 are lasers.

Tunable light sources 9 for use in light generator systems such as an RGB light field generator system 12 can be created in many well-known ways. In one example, semiconductor lasers can form the basis of a tunable light source 9. Semiconductor lasers generally have wide gain bandwidth and hence can be widely tuned if the optical cavity is changed (thermally, mechanically, via free-carrier phase shifts, or using a spinning polygon of gratings, in examples.) For an overview, see: H. Bukkems, "New approaches to widely tunable semiconductor lasers," Eindhoven: Technische Universiteit Eindhoven (2006). In another example, optical parametric oscillators can be used as tunable light sources. This is because optical parametric oscillators and similar systems can create intense, widely-tunable beams. In yet another example, a broadband source such as a super-luminescent diode or supercontinuum laser can be utilized. To create a tunable source, the broadband sources can be passed through a tunable narrow-bandpass filter such as a Lyot filter or Fabry-Perot filter, in examples. Finally, a bank of perhaps 5-200 fixed-wavelength lasers, each with a different wavelength, can be combined into the same fiber or optical path to form a tunable source. Each fixed-wavelength laser in the bank of lasers can be combined via Mach-Zehnder switches, arrayed-waveguide gratings, by using lasers with ports at both sides and lining them up, or according to various other techniques. Then, the lasers can be controlled independently and hence turned on at separate times.

The display 33 includes waveguides 48 that are fabricated in the substrate 36 and are configured to accept and transmit light signals 26 of either red (26-1), green (26-2), or blue (26-3) wavelengths. In the illustrated example, waveguides 48 are arranged in waveguide banks 58-i . . . 58-N. For example, waveguide bank 58-1 includes three waveguides 48R-1, 48G-1, and 48B-1. Waveguides 48R-1, 48G-1, and 48B-1 are respectively fabricated for red light signals 26-1, green light signals 26-2, and blue light signals 26-3. Preferably, the waveguides 48 are formed within SAW modulators 32 constructed and operated in accordance with the wavelength modulation embodiment of the light steering system 10 of FIG. 2, 3A, 3B, or 3C, in different examples. Only the waveguides 48 of the SAW modulators 32 are shown in the top view of the display 33 in FIG. 4.

The light field generator system 12 generally operates as follows. Light signals 26 from the optical source module 40 enter the splitter/switch 49. The splitter/switch 49 splits, switches, and/or combines the light signals 26 such that the light signals 26 enter the waveguides 48 within the waveguide banks 58. The splitter/switch 49 typically connects to the waveguides via fiber connections 103. The splitter/switch 49 then routes the light signals 26 to the waveguides 48 within each of the waveguide banks 58, based on the wavelengths of the light signals 26. For example, the splitter/switch 49 routes red light signals 26-1 to waveguide 48R-1 in waveguide bank 58-1, 48R-2 in waveguide bank 58-2, and to 48R-N in waveguide bank 58-N.

The controller module 60 programs the splitter/switch 49 to route/direct the light signals 26 such that the light signals can enter the waveguides 48 from the same side exit face of the substrate 36.

We note that wavelength-based tuning as employed in the RGB light field generator system 12-1 generally steers light only in one direction. This is sufficient for a horizontal-parallax-only (HPO) display 33, or can be combined with a different method for vertical steering to create a full-parallax display 33, in examples.

In this embodiment the controller module 60 steers the light exiting from the display by controller the wavelength of light generated by the tunable sources 9 and also by controller the RF generator.

In more detail, to provide a specific example, red light generally extends across the wavelength range of 700-635 nm, green generally extends across the wavelength range of 560-520 nm, and blue generally extends across the wavelength range of 490-450 nm.

Each of the tunable sources is then capable of provide different shades of their respective colors. For example, the red tunable source 9-1 might provide tunable narrowband red light centered on 660 nm and tuned across a 5 nm, or 10 nm or 15 nanometer range or more. At the same time, the green tunable source 9-2 might provide tunable narrowband green light centered on 540 nm and tunable across a 5 nm, or 10 nm or 15 nanometer range or more. The blue tunable source 9-3 might provide tunable narrowband blue light centered on 470 nm and tunable across a 5 nm, or 10 nm or 15 nanometer range or more.

Then in operation, the controller module 60 controls the wavelengths of light produced by each of the red tunable source 9-1, green tunable source 9-2, and blue tunable source 9-3 within their respective 5, or 10, or 15 nanometer, or more, tuning range in order to control the angle of light emitted from the display 33.

In addition, in one mode of operation, the controller module 60 controls the RF drive signals produced by the RF signal generator 25 and applied to the IDTs 31 of the display 33 in order to possibly fine-tune the angle of light emitted from the display 33.

FIG. 5 illustrates another RUB light field generator system 12-2.

Here, the controller module 60 programs the splitter/switch 49 to route/direct the light signals 26 via fiber connections 103a and 103b. The light signals are interlaced into nearby waveguides 48 in order to expand a color gamut of the display 33 without introducing inconsistencies across the display.

In this approach, the RUB light field generator system 12-2 operates in a notional interlaced mode when generating its modulated light signals 46. For example, the splitter/switch 49 might be programmed to couple light signals 26 into the waveguides 48 from the left side using fiber connections 103a in even-numbered rows, and from the right side via fiber connections 103b in the odd-numbered rows. As a result, the pixel rows or individual pixels of the modulated light signals 46 are alternated within the display 33 such that the wavelength-vs-angle curve has an opposite slope at different nearby pixels. Such an approach has color implications, which can be viewed graphically in a chromaticity diagram.

Figure 6A:
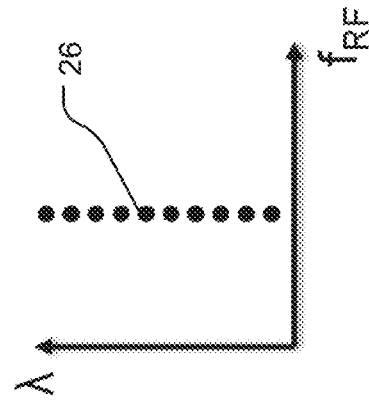
FIG. 6A-6C are plots that represent different approaches for configuring the various embodiments of the light steering systems to steer light, where.
Figure 6B:
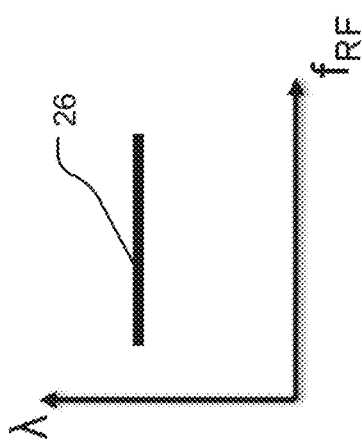
Figure 6C:
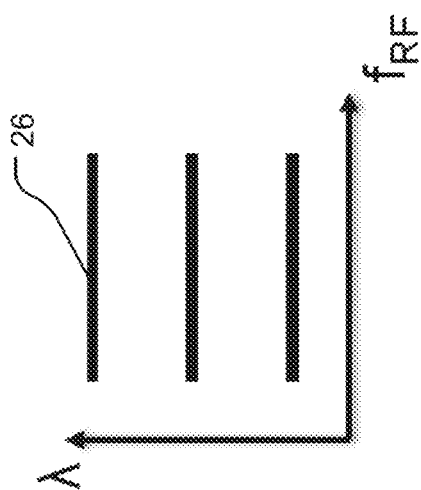

FIG. 6A-6C are schematic plots that represent different ways to steer light, i.e. changing the wavelength of light signals 26 and/or changing the frequency of RF drive signals 15 introduced to the SAW modulators 32 in the light steering systems 10 of FIG. 1 through 3C when integrated into larger RGB light field generator systems as described in FIGS. 4 through 6.

In FIG. 6A, the frequency of the RF drive signal 15 is held fixed. The required wide range of exit angles 39 are then produced by changing the illumination wavelength of the light signals 26, in small steps.

In FIG. 6B, the illumination wavelength/frequency of the light signals 26 is fixed while the frequency of the RF drive signal 15 is changed, thus covering a relatively narrow range of exit angles 39.

FIG. 6C shows a hybrid approach. Here, illumination wavelength of the light signals 26 is used for coarse control of exit angle 39, and frequency of the RF drive signal 15 is used for fine control. This has several advantages over the wavelength-only approach in FIG. 6A, including: potentially simplifying the wavelength-tuning system design; and allowing more of the time-multiplexing budget to be spent instead on other things (such as creating vertical parallax); and enabling the creation of curved wavefronts.

The creation of curved wavefronts typically requires multiple emission angles with a coherent relationship, and hence requires simultaneous emission of multiple angles, as in FIG. 6B or 6C but not in FIG. 6A. Use of curved wavefronts has various advantages including smoother motion parallax and improved accommodation cues. See: "Interactive holographic stereograms with accommodation cues," Smithwick et al., 2010, Proc, SPIE 7619, Practical Holography XXIV: Materials and Applications, 761903 for example).

Figure 7:
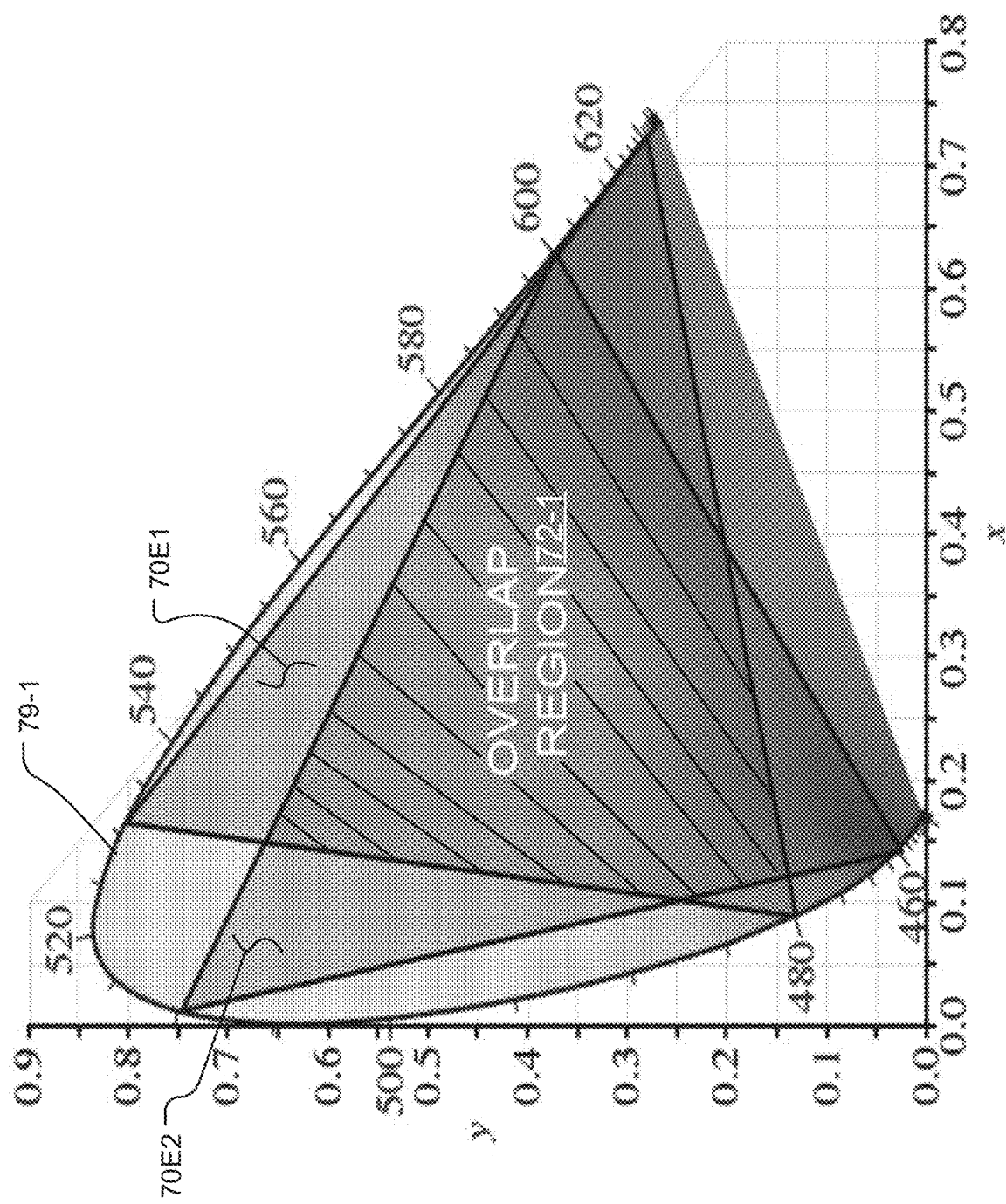
FIG. 7 is a chromaticity diagram that is applicable to the RGB light field generator system of FIG. 4, where the diagram leverages the concept of metamerism to minimize the perception of artifacts in the light signals when an observer is viewing light signals emitted from the display of the RGB light field generator system.

FIG. 7 shows a chromaticity diagram 79-1 that is applicable to the RGB light field generator system 12-1 of FIG. 4. The chromaticity diagram 79-1 can be used to minimize the perceptual impact of artifacts introduced into light signals emitted from the RGB light field generator system 12-1 due to the wavelength tuning of the sources 9 within their respective respective 5, or 10, or 15 nanometer tuning bands.

The artifacts are typically these shifts in wavelengths of the colors within the light signals 46 to effect the require angular scanning. These artifacts can then viewed by an observer 99 as color distortions. We propose to greatly reduce this problem using metamerism.

Metamerism is a perceived matching of colors by the human eye that do not actually have identical spectral power distributions. A spectral power distribution describes the proportion of total light emitted, transmitted, and/or reflected by a color sample at each visible wavelength, and therefore defines the complete information about the light coming from the source. However, the human eye contains only three color receptors (three types of cone cells), and each type of cone responds to the cumulative energy from a broad range of wavelengths. As a result, the human eye reduces all colors to three sensory quantities, called the tristimulus values. Due to this limitation, different combinations of light across all wavelengths can produce an equivalent receptor response (i.e. the same tristimulus value), which the human brain perceives as being the same color. Many different spectral energy distributions can produce the perception of the same color. Different spectral energy distributions that produce the perception of the same color are also known as metamers.

Metamerism offers a solution to the anticipated side-effects of using wavelength-based light-steering.

In FIG. 7, the concept of metamerism is leveraged to reduce artifacts from being viewed by an observer 99. For this purpose, chromaticity plots 70E1 and 70E2 are plotted on a chromaticity diagram 79-1. The chromaticity diagram 79-1 is based upon a CIE 1931 xyz color space. The axes are the (x, y) visual perception coordinates as defined in the CIE 1931 xyz color space.

Chromaticity plots 70E1 and 70E2 cover different triangular regions within the CIE 1931 xyz color space, the intersection of which forms a color gamut for the display 33. The chromaticity plot 70E1 corresponds to the range of colors of the light signals 46-1 achievable at one extreme view-angle of the display (e.g. exit angle 39-1), where the ratio of red:green:blue controls the color within this triangle. Chromaticity plot 70E2, in contrast, corresponds to the range of colors of the light signals 46-2 achievable at the opposite extreme view-angle of the display (e.g. exit angle 39-2). An overlap region 72-1 formed by the intersection between the two triangular regions of the chromaticity plots 70E1/70E2 (and between other intermediate triangles not shown) represents a color gamut of the display 33. A color gamut defines the colors that can be displayed into any direction.

A display's "color gamut" is the set of colors that the display 33 will attempt to create. Other colors are mapped to the nearest point in the color gamut. So the display is only trying to create colors in the overlap region 72-1. For each view angle of each pixel, the display is supposed to have a certain color in the overlap region 72-1. Depending on the view angle, there is a certain red wavelength, a certain green wavelength, and a certain blue wavelength that are available to create this desired color. In one implementation, the controller module 60 adjusts the brightness of red, green, and blue at the appropriate location to create the desired color. As long as the desired color is within the overlap region 72-1, it will always be mathematically possible to find a mixture of the available wavelengths of red, green, and blue which create the desired color for the display's addressable angles.

Figure 8:
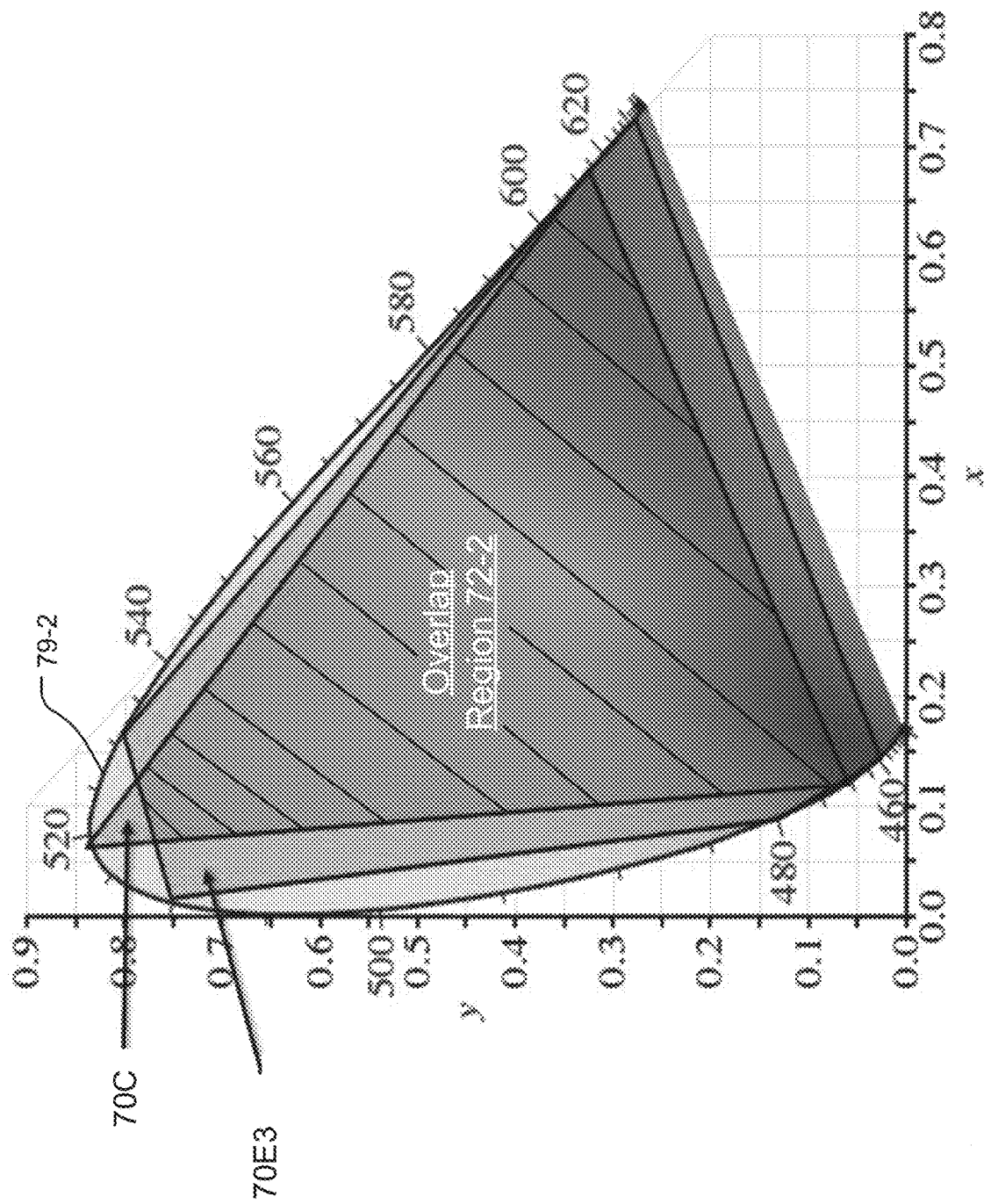
FIG. 8 is a chromaticity diagram that is applicable to the RGB light field generator system of FIG. 5.

FIG. 8 shows another chromaticity diagram 79-2 that can be used to minimize the perceptual impact of artifacts introduced into light signals emitted from the RGB light field generation system of FIG. 5, when the system utilizes a SAW-based light steering system as in FIG. 2.

In this approach, the RGB light field generation system of FIG. 5 operates in a notional interlaced mode. For example, the splitter/switch 49 might be programmed to couple light signals 26 into the waveguides 48 from the left side in even-numbered rows, and from the right side in the odd-numbered rows. As a result, the pixel rows or individual pixels are alternated within the display 33 such that the wavelength-vs-angle curve has an opposite slope at different nearby pixels. Such an approach has color implications, which can be viewed graphically in the chromaticity diagram 79-2.

In FIG. 8, the concept of metamerism is also leveraged to reduce artifacts. For this purpose, chromaticity plots 70E3 and 70C are plotted on chromaticity diagram 79-2. The chromaticity plot 70E3 corresponds to the range of colors achievable at extreme view-angles of the display (e.g. exit angles 39-1/39-2). Chromaticity plot 70C is associated with a range of colors of the light signals 46 at a central value of the exit angle 39.

An overlap region 72-2 formed by the intersection of chromaticity plots 70E3 and 70C forms a color gamut for the display 33. In the color gamut, the different color shades from the alternate rows would most likely blend together to create a perceptually (approximately) uniform color. Compared to the color gamut in FIG. 7, the color gamut in FIG. 8 is likely to be larger with this approach, but the color blending might create visible artifacts in certain situations. In particular, single-pixel features would have slightly distorted colors. The rendering algorithm could partially compensate for this, using pixel blending and manipulation techniques known to display engineers.

While this invention has been particularly shown and described with references to preferred embodiments thereof, it will be understood by those skilled in the art that various changes in form and details may be made therein without departing from the scope of the invention encompassed by the appended claims.

What is claimed is:

1. A light steering system, comprising:
    a diffractive modulator that steers light using diffraction;
    a multiwavelength light source that generates light at different wavelengths for input into the diffractive modulator;
    a controller for controlling a wavelength of light generated by the multiwavelength light source to control an angle of light emitted from the diffractive modulator; and
    a radio frequency signal generator for providing radio frequency drive signals to the modulator, wherein the radio frequency signal generator is controlled by the controller.

2. A system as claimed in claim 1, wherein the diffractive modulator is an acoustic optic modulator.

3. A system as claimed in claim 1, wherein the diffractive modulator is a surface acoustic wave (SAW) modulator.

4. A system as claimed in claim 1, wherein the multiwavelength light source generates light that is tunable over a wavelength range of greater than 5 nanometers by the controller to control an angle of light emitted from the diffractive modulator.

5. A system as claimed in claim 1, further comprising a grating for increasing a steered angle of the light from the diffractive modulator.

6. A system as claimed in claim 1, wherein the controller modulates a wavelength of the light from the multiwavelength light source to provide a coarse change in angular extent of the light emitted by the diffractive modulator, and the controller frequency modulates of the RF drive signals generated by the radio frequency signal generator applied to the modulator to provide a fine change in the angular extent of the light emitted by the modulator.

7. A system as claimed in claim 1, wherein the diffractive modulator comprises a substrate and a transducer, being driven by the radio frequency drive signals, for the substrate for generating a surface acoustic wave that diffracts light in the diffractive modulator.

8. A system as claimed in claim 7, wherein the surface acoustic wave diffracts the light to propagate toward a distal face of the substrate and the light is redirected to exit out a proximal face of the substrate.

9. A system as claimed in claim 8, wherein the light is redirected by a grating.

10. A system as claimed in claim 8, wherein the light is redirected by a reflective diffractive grating.

11. A system as claimed in claim 8, wherein the light, after exiting out of the proximal face, is further conditioned by an optical element.

12. A system as claimed in claim 11, wherein the optical element is a diffractive lens.

13. A system as claimed in claim 11, wherein the optical element is a refractive lens.

* * * * *

UNITED STATES PATENT AND TRADEMARK OFFICE
CERTIFICATE OF CORRECTION

PATENT NO. : 10,935,868 B2
APPLICATION NO. : 16/140714
DATED : March 2, 2021
INVENTOR(S) : Steven J. Byrnes et al.

It is certified that error appears in the above-identified patent and that said Letters Patent is hereby corrected as shown below:

On the Title Page

Item (57), In the Abstract Line 1, delete "A light steeling system and method for diffractive steering of" and insert --"A light steering system and method for diffractive steering of"--.

In the Claims

In Claim 6, Column 16, Line 43, delete "the controller frequency modulates of the RF drive signals" and insert --the controller frequency modulates the RF drive signals--.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*